(12) United States Patent
Ushioda (10) Patent No.: US 10,951,748 B2
(45) Date of Patent: Mar. 16, 2021

(54) ELECTRONIC DEVICE FOR USE IN A TELECONFERENCE

(71) Applicant: LENOVO (SINGAPORE) PTE. LTD., Singapore (SG)

(72) Inventor: Tatsuya Ushioda, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/517,662

(22) Filed: Jul. 22, 2019

(65) Prior Publication Data

US 2020/0336813 A1 Oct. 22, 2020

(30) Foreign Application Priority Data

Apr. 18, 2019 (JP) .............................. JP2019-079464

(51) Int. Cl.
| | | |
|---|---|---|
| *H04M 1/60* | (2006.01) | |
| *H04R 1/02* | (2006.01) | |
| *H04M 1/03* | (2006.01) | |
| *H04M 1/62* | (2006.01) | |
| *H04R 1/40* | (2006.01) | |
| *H04R 3/00* | (2006.01) | |
| *H04M 1/02* | (2006.01) | |

(52) U.S. Cl.
CPC ........... *H04M 1/6033* (2013.01); *H04M 1/03* (2013.01); *H04M 1/62* (2013.01); *H04R 1/025* (2013.01); *H04M 1/0297* (2013.01); *H04M 1/035* (2013.01); *H04R 1/406* (2013.01); *H04R 3/005* (2013.01)

(58) Field of Classification Search
CPC ........ H04R 1/025; H04R 1/406; H04R 3/005; H04M 1/02; H04M 1/0297; H04M 1/03; H04M 1/035; H04M 1/6033; H04M 1/62; H04M 1/738; H04M 1/0249; H04M 1/026; H04M 1/72527; H04M 3/567
USPC ....... 381/79, 91, 355, 361, 365; 379/388.02, 379/420.01, 420.02, 420, 3, 428.01, 429, 379/433.02, 433.03, 433.05, 432, 434
See application file for complete search history.

(56) References Cited

U.S. PATENT DOCUMENTS

| | | | | |
|---|---|---|---|---|
| 5,029,236 A | * | 7/1991 | Yasuda ................. | H04B 1/036 361/697 |
| 7,386,109 B2 | * | 6/2008 | Suzuki .................. | H04R 1/406 379/202.01 |
| 2015/0018046 A1 | * | 1/2015 | Nabata ................. | H04M 1/026 455/566 |
| 2016/0269067 A1 | * | 9/2016 | Pidwerbecki ......... | H05K 3/284 |

FOREIGN PATENT DOCUMENTS

| | | | | |
|---|---|---|---|---|
| JP | 2008245250 A | | 10/2008 | |
| WO | WO-2017053714 A1 | * | 3/2017 | ........... H04R 1/2826 |

* cited by examiner

*Primary Examiner* — Jesse A Elbin
(74) *Attorney, Agent, or Firm* — Shimokaji IP (57) ABSTRACT

An electronic device includes a chassis which has mutually partitioned first chamber, second chamber and third chamber, an electronic substrate which is housed in the first chamber, loudspeaker modules which are housed in the second chamber and the microphones which are housed in the third chamber.

8 Claims, 6 Drawing Sheets

ELECTRONIC DEVICE FOR USE IN A TELECONFERENCE

FIELD OF THE INVENTION

The present invention relates to an electronic device which is utilizable as a terminal device in a teleconference.

BACKGROUND OF THE INVENTION

Nowadays, an electronic device which makes it possible to hold a conference and to make telephone calls between/among persons at distant places via voices and projected images by utilizing the Internet, a telephone line and so forth is utilized. The electronic device of this kind is configured on the assumption that a plurality of persons simultaneously makes the telephone calls and so forth at respective places and therefore a microphone and a loudspeaker are loaded on the electronic device (see, for example, Japanese Unexamined Patent Application Publication No. 2008-245250).

SUMMARY OF THE INVENTION

It is necessary for an electronic device such as the above-described device to simultaneously achieve a microphone performance and a loudspeaker performance. However, since it is necessary for the electronic device of this kind to deliver the voice into a wide room, it is necessary for the electronic device of this kind to be equipped with a somewhat large-sized loudspeaker. Consequently, a chassis shakes with a vibration of the loudspeaker and a noise is generated in a case where the microphone captures this vibration.

In a configuration of the above-mentioned Japanese Unexamined Patent Application Publication No. 2008-245250, the microphones are arranged on four corners of a cross-shaped chassis and the loudspeaker is arranged on the center of the chassis thereby to keep the both away from each other and to suppress generation of the noise. However, in this configuration, since the microphones and the loudspeaker are arranged in the same space, sound quality improvement is limited and the size of the chassis is increased.

The present invention has been made in view of the above-described issues of related art and aims to provide an electronic device which is able to ensure optimum arrangement and sound quality of microphones and loudspeakers.

An electronic device according to the first aspect of the present invention includes a chassis which has mutually partitioned first chamber, second chamber and third chamber, an electronic substrate which is housed in the first chamber, a loudspeaker which is housed in the second chamber, and a microphone which is housed in the third chamber.

The electronic device may be also configured that the chassis includes a first chassis in which the first chamber and the second chamber are disposed and a second chassis which is attached to an upper surface of the first chassis and in which the third chamber is disposed, an inner space of the first chassis is partitioned into two upper and lower stages with a frame member and thereby the second chamber is arranged above the first chamber, and the loudspeaker is supported on an upper surface of the frame member.

The electronic device may further include a cooling module which is housed in the first chamber and is disposed above the electronic substrate and may be also configured so that the cooling module has a fan which sucks air from the outside of the first chamber and exhausts the air to the outside of the first chamber and a fin which is disposed on an air flow path which is created by the fan and absorbs heat that a heating element which is mounted on the electronic substrate generates.

The electronic device may be also configured that the first chassis has a disc-shaped bottom section and a peripheral surface section which is disposed on the bottom section and is equipped with a conical outer peripheral surface that an outer diameter thereof is gradually reduced as it goes upward and the second chassis is formed into a disc shape and is attached to an upper surface of the peripheral surface section.

The electronic device may be also configured that an input operation section is disposed in the second chassis.

The electronic device may be also configured that the frame member has a protruding part which extends along a front-rear direction of the first chassis and is expanded upward and one pair of plane parts which is disposed on both sides of the protruding part in a right-left direction which is orthogonal to a direction that the protruding part extends, the loudspeaker is disposed on each of one pair of the plane parts and the cooling module is at least partially housed in a space which is formed on the lower surface side of the protruding part and makes air flow along the front-rear direction.

The electronic device may be also configured that a suction port through which air is sucked into the first chamber is disposed on one side of the bottom section in the front-rear direction and an exhaust port through which the air is exhausted from the first chamber is disposed on the other side of the bottom section in the front-rear direction.

The electronic device may be also configured so that a connection terminal to which a cable which electrically connects the electronic substrate with an external device is to be connected is disposed on the bottom section and the connection terminal is disposed at a position where the connection terminal overlaps the air flow path which is created by the fan of the cooling module.

The electronic device may be also configured so that the loudspeaker which is disposed on the plane part which is located on the left of the protruding part is arranged to face an inner surface of the peripheral surface section with a gap being interposed therebetween by being arranged to direct toward diagonally upper left in the right-left direction, the loudspeaker which is disposed on the plane part which is located on the right of the protruding part is arranged to face the inner surface of the peripheral surface section with a gap being interposed therebetween by being arranged to direct toward diagonally upper right in the right-left direction, and holes are formed in the peripheral surface section at least at positions where the holes face the loudspeakers.

The above-described aspects of the present invention can ensure the quality of the microphones and the quality of the loudspeakers while configuring the chassis into a compact form.

DETAILED DESCRIPTION OF THE INVENTION

In the following, an electronic device according to the present invention will be described in detail by giving a preferable embodiment with reference to the appended drawings.

Figure 1:
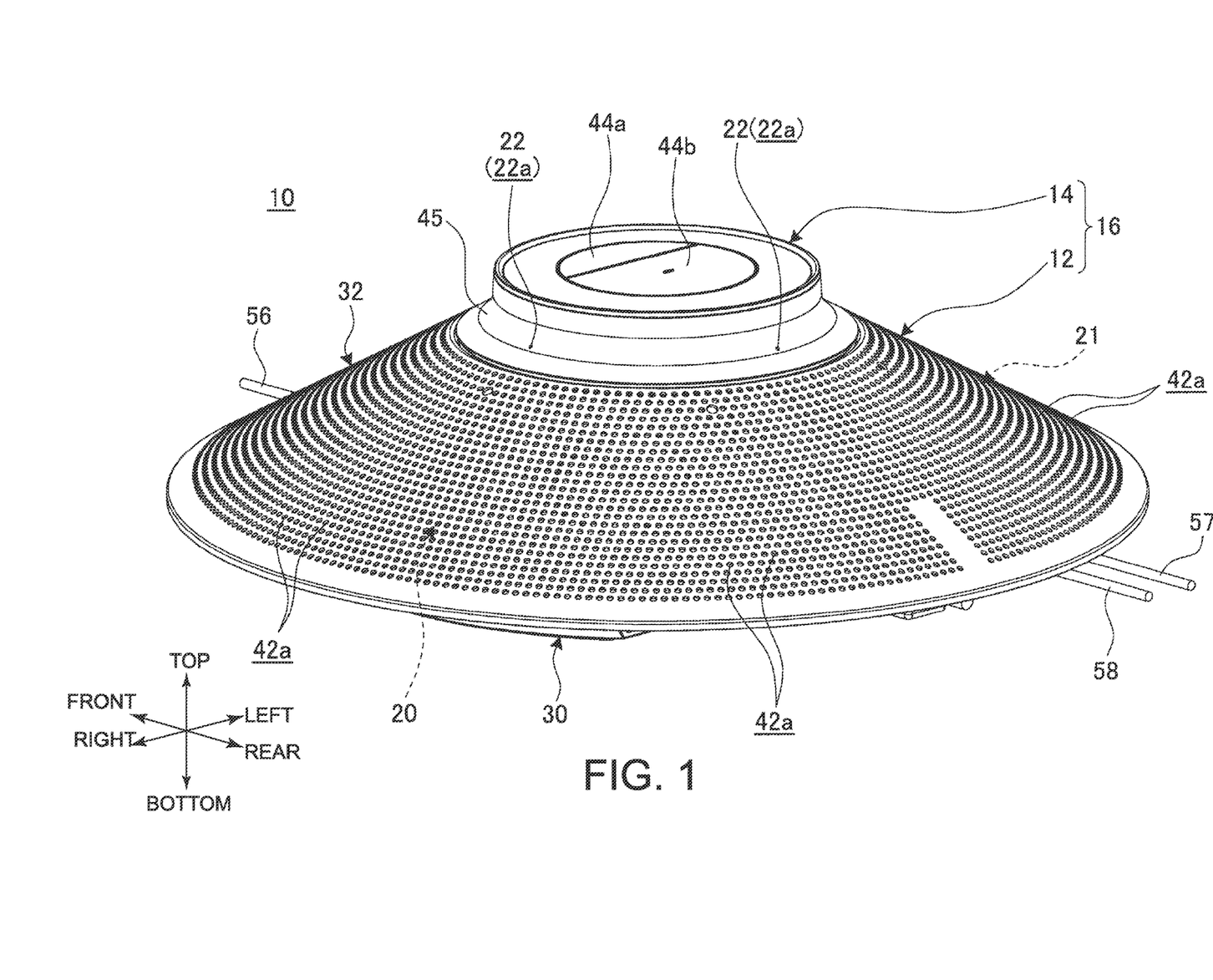
FIG. 1 is a perspective view illustrating one example of an electronic device according to one embodiment.
Figure 2:
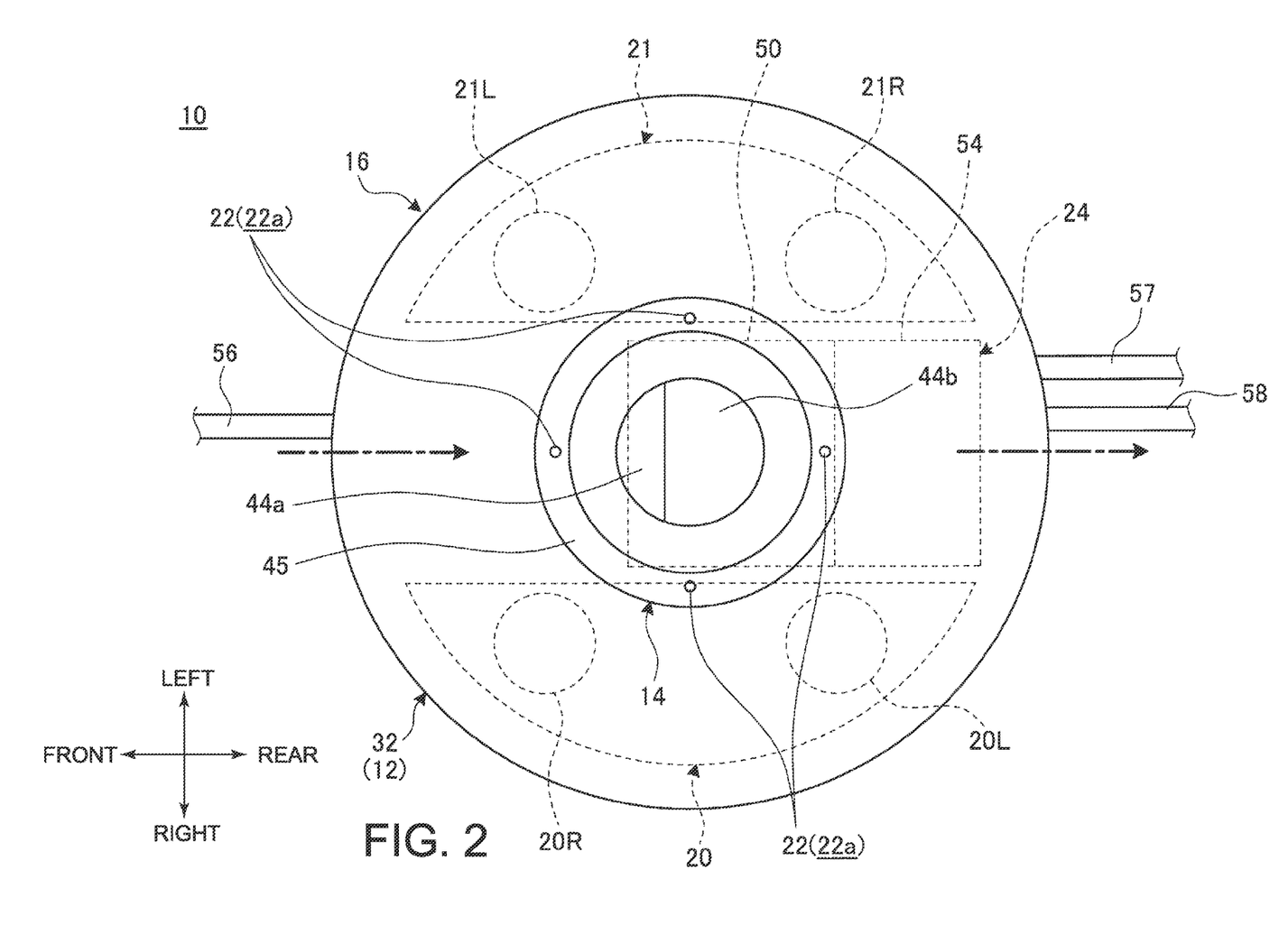
FIG. 2 is a schematic plan view illustrating one example of the electronic device illustrated in FIG. 1.
Figure 3:
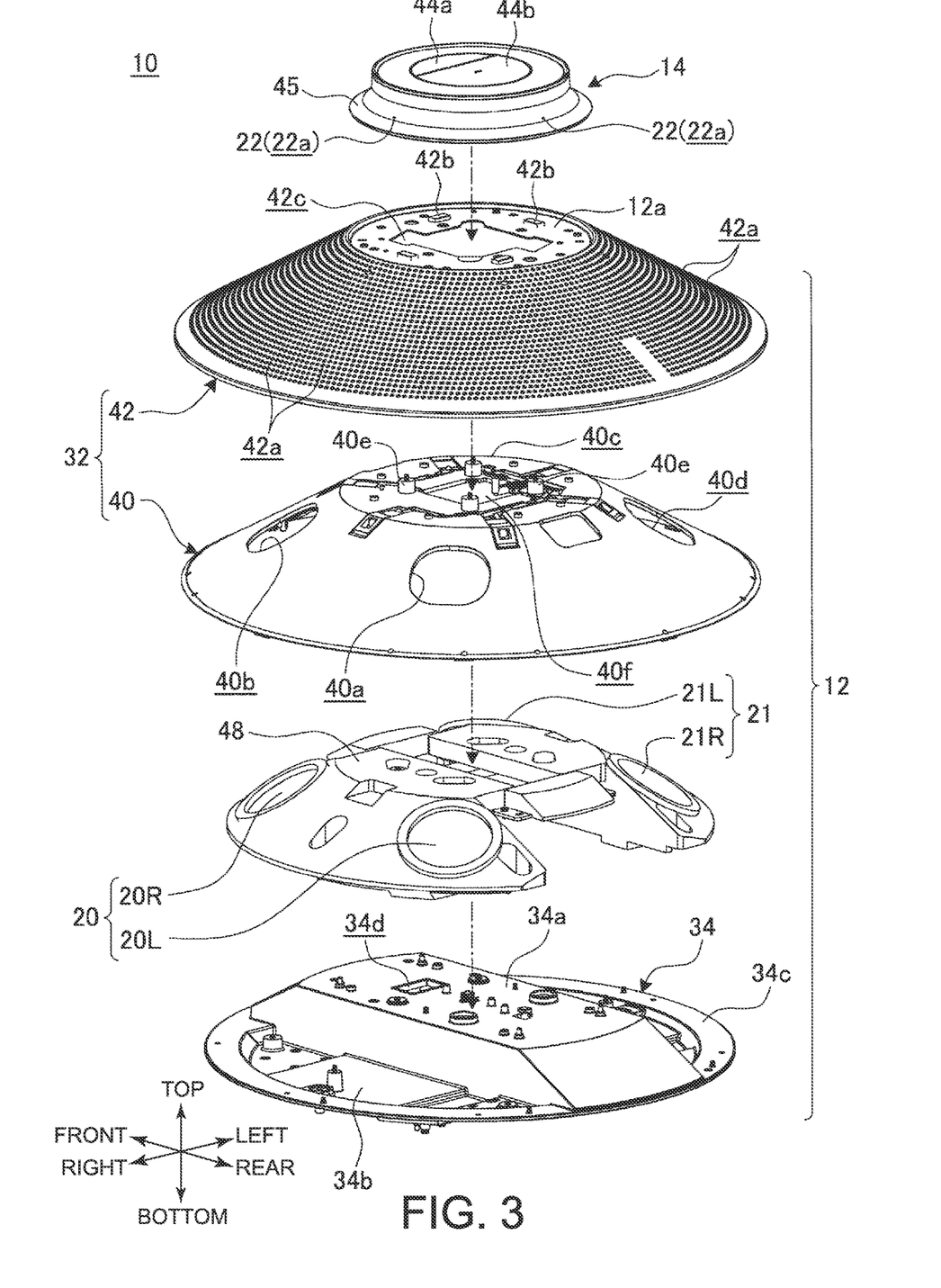
FIG. 3 is an exploded perspective view illustrating one example of upper elements of the electronic device illustrated in FIG. 1.
Figure 4:
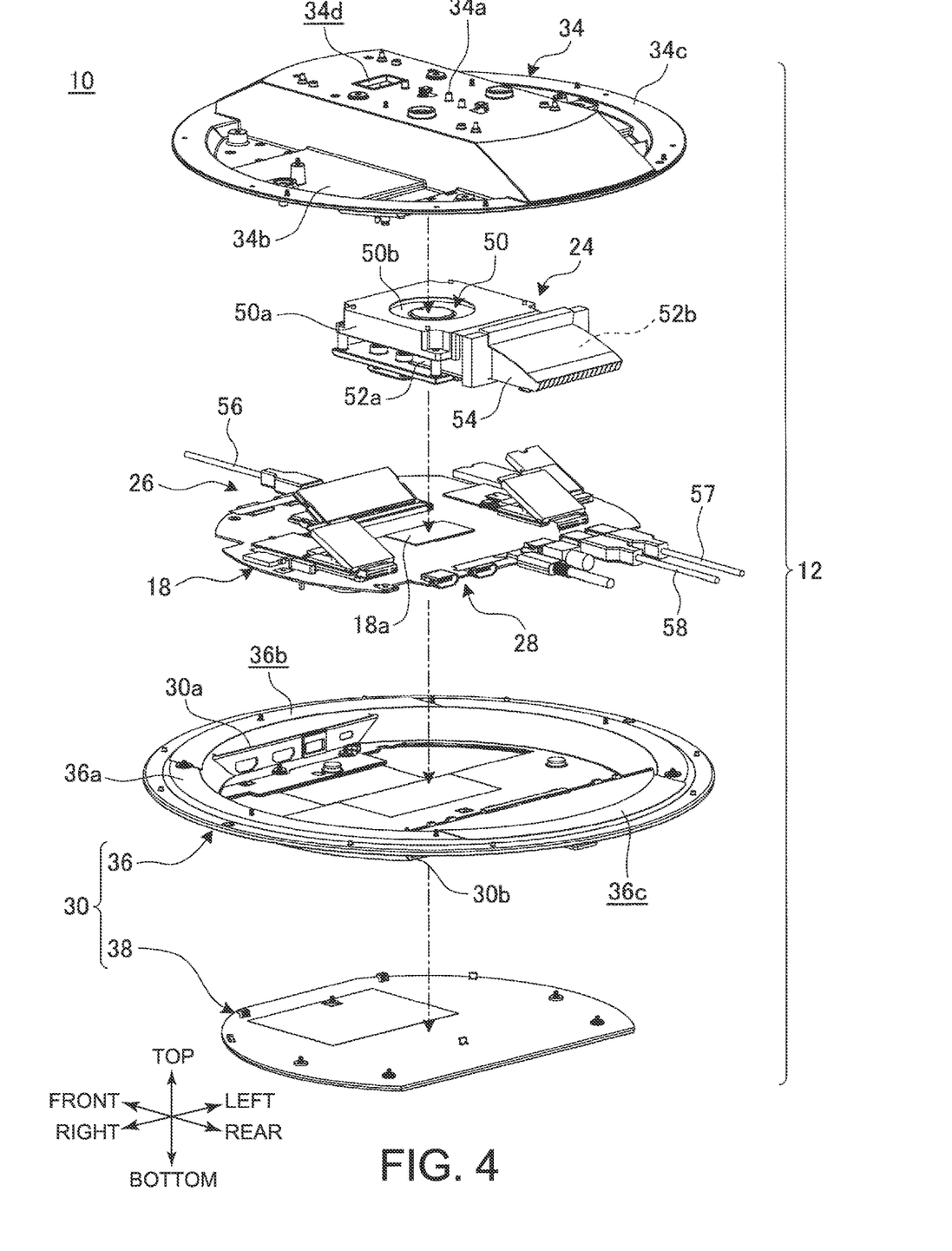
FIG. 4 is an exploded perspective view illustrating one example of lower elements of the electronic device illustrated in FIG. 1.

FIG. 1 is a perspective view illustrating one example of an electronic device 10 according to one embodiment of the present invention. FIG. 2 is a schematic plan view illustrating one example of the electronic device 10 illustrated in FIG. 1. FIG. 3 is an exploded perspective view illustrating one example of upper elements of the electronic device 10 illustrated in FIG. 1. FIG. 4 is an exploded perspective view illustrating one example of lower elements of the electronic device 10 illustrated in FIG. 1. The electronic device 10 according to the present embodiment is a terminal device which is used in, for example, an online conference system of holding a conference and making telephone calls between/among persons at distant places which are mutually connected over the Internet by utilizing voices and projected images.

As illustrated in FIG. 1 to FIG. 4, the electronic device 10 includes a chassis 16 which has a first chassis 12 and a second chassis 14, an electronic substrate 18, loudspeaker modules 20, 21, microphones 22, a cooling module 24, a front terminal group 26 and a rear terminal group 28.

Figure 5:
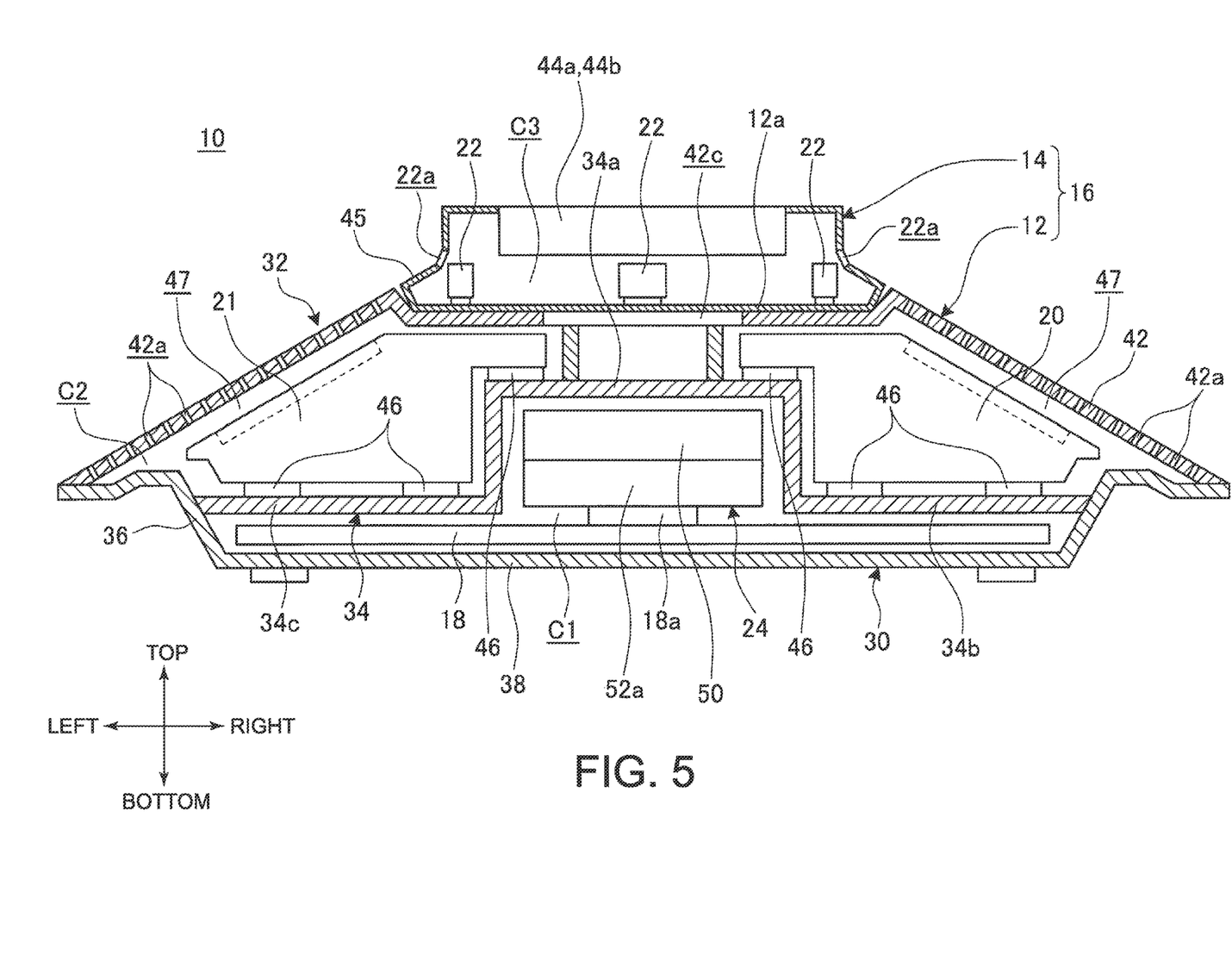
FIG. 5 is a schematic sectional diagram illustrating one example of the electronic device which is cut down from the top planarly along a right-left direction.
Figure 6:
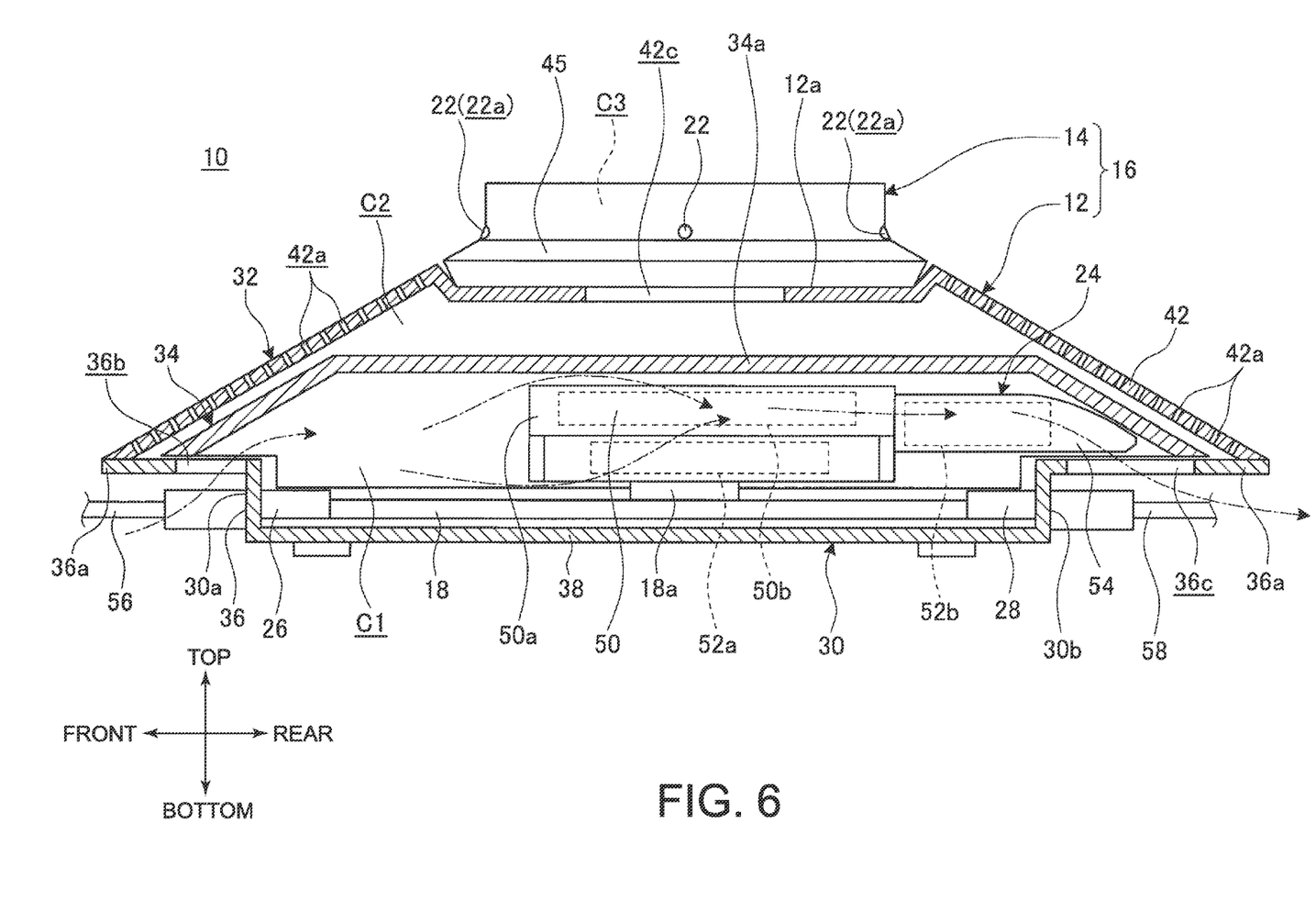
FIG. 6 is a schematic sectional diagram illustrating one example of the electronic device which is cut down from the top planarly along a front-rear direction.

In the following, the electronic device 10 will be described by calling an upward direction and a downward direction in FIG. 1 as "top" and "bottom" respectively and calling the left side, the right side, the upper side and the lower side in FIG. 2 as "front" (a front surface), "rear" (a back surface), "left" and "right" respectively. FIG. 5 is a schematic sectional diagram illustrating one example of the electronic device 10 which is cut down from the top planarly along a right-left direction. FIG. 6 is a schematic sectional diagram illustrating one example of the electronic device 10 which is cut down from the top planarly along a front-rear direction.

The chassis 16 is in the form of an almost truncated cone shape (a Mount-Fuji-like shape) as a whole. The chassis 16 has a configuration that the second chassis 14 is attached onto the first chassis 12. The first chassis 12 is in the form of a truncated cone shape that an outer diameter thereof is gradually reduced as it goes from the bottom to the top. The second chassis 14 is in the form of a disc shape and is attached onto an upper surface 12a of the first chassis 12. A first chamber C1, a second chamber C2 and a third chamber C3 are disposed in ascending order in an inner space of the chassis 16 (see FIG. 5 and FIG. 6). The first chamber C1 and the second chamber C2 are formed in the first chassis 12. The third chamber C3 is formed in the second chassis 14.

As illustrated in FIG. 5 and FIG. 6, the first chassis 12 includes a bottom section 30, a peripheral surface section 32 and a frame member 34. The bottom section 30 and the peripheral surface section 32 configure an outer wall of the first chassis 12. The frame member 34 partitions the inner space of the first chassis 12 into two upper and lower stages.

As illustrated in FIG. 4 to FIG. 6, the bottom section 30 is a disc-shaped chassis member having an upper surface that is opened. The bottom section 30 is configured by a dish-shaped base cover 36 and a bottom cover 38 which is attached to a bottom surface of the base cover 36. The base cover 36 and the bottom cover 38 are made of, for example, a resin or a metal such as magnesium and so forth. An upper-surface opening of the base cover 36 of the bottom section 30 is closed with the frame member 34. The first chamber C1 is formed between an inner space of the bottom section 30 and a space which is located under the frame member 34. The first chamber C1 is a housing space for the electronic substrate 18 and the cooling module 24. A ring-shaped flange 36a is disposed on an upper outer periphery of the base cover 36. A suction port 36b is formed in a front portion of the flange 36a and an exhaust port 36c is formed in a rear portion of the flange 36a (see FIG. 4 and FIG. 6).

As illustrated in FIG. 3, the peripheral surface section 32 is disposed on the bottom section 30. The peripheral surface section 32 is a chassis member which includes a conical outer peripheral surface having an outer diameter that is gradually reduced as it goes upward. The peripheral surface section 32 has a configuration so that a loudspeaker grill 42 is laminated on a loudspeaker cover 40. The loudspeaker cover 40 and the loudspeaker grill 42 are made of, for example, the resin or the metal such as magnesium and so forth similarly. Illustration of the loudspeaker cover 40 is omitted in FIG. 5 and FIG. 6.

The loudspeaker cover 40 is a truncated cone shaped member having a lower surface that is opened. One pair of front and rear openings 40a and 40b is formed in a right-facing surface of the loudspeaker cover 40 and one pair of front and rear openings 40c and 40d is similarly formed in a left-facing surface of the speaker cover 40. Four attachment bosses 40e and a cable insertion hole 40f are formed on/in an upper surface of the loudspeaker cover 40. The attachment bosses 40e are mounts to which the second chassis 14 is to be attached. The cable insertion hole 40f is formed in an almost central portion of the upper surface of the loudspeaker cover 40 and a cable which extends from the second chassis 14 is inserted into the cable insertion hole 40f.

The loudspeaker grill 42 is a truncated cone shaped member having a lower surface that is opened. Fine holes 42a are formed in the loudspeaker grill 42 over the almost entire area of a skirt-shaped peripheral surface thereof. In the present embodiment, appearance and designability of the electronic device 10 is enhanced by forming the holes 42a in the loudspeaker grill 42 over the almost entire area of the peripheral surface thereof. However, it is sufficient that the holes 42a be formed at least at positions where the holes 42a overlap the respective openings 40a to 40d in the loudspeaker cover 40. Four bushes 42b and a cable insertion hole 42c are formed on/in the upper surface 12a of the speaker grill 42 (that is, the first chassis 12). The bushes 42b are support stands which support a bottom surface of the second chassis 14. The cable insertion hole 42c is formed in an almost central portion of the upper surface 12a and the cable which extends from the second chassis 14 is inserted into the cable insertion hole 42c.

As illustrated in FIG. 5 and FIG. 6, a lower-surface opening of the peripheral surface section 32 is closed with the frame member 34. The second chamber C2 is formed between an inner space of the peripheral surface section 32 and a space which is located above the frame member 34. The second chamber C2 is a housing space for the loudspeaker modules 20 and 21.

As illustrated in FIG. 4 to FIG. 6, the frame member 34 is a partition member which forms the first chamber C1 and the second chamber C2 by partitioning the inside of the first chassis 12 into two upper and lower stages. The frame member 34 also functions as a reinforcement member which increases the strength of the first chassis 12. The frame member 34 is formed from a metal plate made of aluminum, stainless-steel and so forth and has high rigidity.

The frame member 34 has a protruding part 34a and one pair of right and left plane parts 34b, 34c. The protruding part 34a has a shape that an almost central part of the frame member 34 concerned in the right-left direction is expanded upward and extends in the front-rear direction. The protruding part 34a is in the form of an almost trapezoidal shape in a side-face view and a lower surface thereof is opened. The protruding part 34a increases in height dimension of the first chamber C1 and a housing space for the cooling module 24 is formed on the lower-surface side of the protruding part 34a. The protruding part 34a is large enough to allow housing of the cooling module 24 therein (see FIG. 5 and FIG. 6). The protruding part 34a also functions as a reinforcement part which increases the rigidity of the frame member 34. The plane parts 34b and 34c are almost semicircular plates. The plane parts 34b and 34c serve as installation surfaces for the loudspeaker modules 20 and 21.

As illustrated in FIG. 1 to FIG. 6, the second chassis 14 has a hat-like shape that an outer peripheral lower portion of a disc-shaped part is spread like a skirt. The second chassis 14 is made of the resin or the metal such as magnesium and so forth similarly. The second chassis 14 loads thereon a microphone function which is achieved by the microphones 22 and a human interface function (an input operation section) which is achieved by operation buttons 44a and 44b and a touch operation section 45. The operation buttons 44a and 44b have functions of enter buttons, mute buttons, back buttons and so forth. The touch operation section 45 has a sound volume adjustment function, a navigation function and so forth. The third chamber C3 is an inner space of the second chassis 14. The third chamber C3 is a housing space for mechanism parts such as the microphones 22, the operation buttons 44a and 44b and so forth.

The electronic substrate 18 is housed in the first chamber C1. The electronic substrate 18 mounts thereon various electronic components such as a CPU (Central Processing Unit) 18a, a memory and so forth. The electronic substrate 18 is a mother board of the electronic device 10 concerned. The loudspeaker modules 20, 21, the microphones 22, the cooling module 24, a communication module (not illustrated) and so forth are connected to the electronic substrate 18.

The loudspeaker modules 20 and 21 output voices and so forth to the outside through the openings 40a to 40d and the holes 42a. As illustrated in FIG. 2 and FIG. 3, the right loudspeaker module 20 is arranged to direct toward diagonally upper right of the chassis 16 and is configured by one pair of loudspeakers 20L and 20R which are arrayed in the front-rear direction. The left loudspeaker module 21 is arranged to direct toward diagonally upper left of the chassis 16 and is configured by one pair of loudspeakers 21L and 21R which are arrayed in the front-rear direction. The loudspeaker modules 20 and 21 are housed in the second chamber C2 of the first chassis 12. Cables which are connected to the respective loudspeakers 20L, 20R, 21L and 21R are connected to the electronic substrate 18 passing through an opening 34d in the frame member 34.

As illustrated in FIG. 5, the right loudspeaker module 20 is supported on the right plane part 34b of the frame member 34 with a cushion material 46 being interposed therebetween. The left loudspeaker module 21 is supported on the left plane part 34c of the frame member 34 with the cushion material 46 being interposed therebetween. Parts of the loudspeaker modules 20 and 21 which are arranged on an upper surface of the protruding part 34a are supported on the upper surface of the protruding part 34a with the cushion material 46 being interposed therebetween similarly. The cushion material 46 is a member which is able to absorb vibrations which are generated from the loudspeaker modules 20 and 21 and is, for example, a rubber bush. Each of the loudspeaker modules 20 and 21 is arranged in a state of leaving a gap 47 relative to an inner surface of the peripheral surface section 32 (see FIG. 5). Owing to this arrangement, the vibrations of the loudspeaker modules 20 and 21 are not directly transmitted to the peripheral surface section 32. The loudspeaker modules 20 and 21 according to the present embodiment are coupled together via a bridge section 48 into an integrated structure (see FIG. 3). The bridge section 48 is disposed to stride over the protruding part 34a of the frame member 34 in the right-left direction.

The microphones 22 are disposed to direct in four directions, that is, frontward, rearward, leftward and rightward directions of the second chassis 14. Four microphones 22 are disposed on the front, rear, right and left inside the third chamber C3 of the second chassis 14 (see FIG. 2). Each microphone 22 is supported in a floating state relative to the second chassis 14 with a predetermined cushion material being interposed therebetween. Fine microphone holes 22a are formed in an outer wall of the second chassis 14 at positions where the microphone holes 22a face the respective microphones 22. Each microphone 22 converts voices and so forth which are received from the outside through each microphone hole 22a into electric signals and transmits the electric signals to the electronic substrate 18. Cables which extend from the second chassis 14 and include the cables which extend from the microphones 22 are connected to the electronic substrate 18 passing through the cable insertion holes 40f, 42c and the opening 34d.

As illustrated in FIG. 4 to FIG. 6, the cooling module 24 is arranged above the electronic substrate 18 in the first chamber C1. In a case of the present embodiment, the cooling module 24 is housed in the inner space of the protruding part 34a of the frame member 34. The cooling module 24 is adapted to cool heating elements such as the CPU 18a and so forth which are mounted on the electronic substrate 18. The cooling module 24 has a fan 50, fins 52a, 52b and an exhaust duct 54.

The fan 50 has a fan chassis 50a and an impeller part 50b which is disposed to be rotatable in the fan chassis 50a. The fan 50 sucks the outside air through the suction port 36b which is formed in the front part of the bottom section 30 into the first chamber C1 and exhausts the air out of the first chamber C1 through the exhaust port 36c which is formed in the rear part of the bottom section 30. The fan 50 according to the present embodiment is configured to suck the outside air simultaneously through an upper surface and a lower surface of the fan chassis 50a and exhaust the air out through a rear surface of the fan chassis 50a. An arrow which is indicated by a dashed line in FIG. 2 and FIG. 6 indicates a schematic flow of the outside air which is created by the cooling module 24.

The fin 52a is arranged under the fan chassis 50a. The fin 52a abuts on the CPU 18a to enable heat transfer from the CPU 18a to the fin 52a. The fin 52a absorbs heat from the CPU 18a and radiates the heat to the outside air which is made to flow by the fan 50. The exhaust duct 54 is connected to the exhaust port 36c in the fan chassis 50a and makes the air which is sent from the fan 50 flow out through the exhaust port 36c. The fin 52b is arranged in the exhaust duct 54. The fin 52b is disposed to enable heat transfer from the CPU 198a and other electronic components to the fin 52b.

Accordingly, the cooling module 24 is able to efficiently cool the electronic substrate 18 which is disposed in the first chamber C1 and various electronic components such as the CPU 18a and so forth which are mounted on the electronic substrate 18. In this case, the loudspeaker modules 20, 21 and the microphones 22 are disposed in the second chamber C2 and the third chamber C3 respectively which are partitioned apart from the first chamber C1. Therefore, generation of noises and so forth due to the influence of a wind that the fan 50 creates and a vibration that the fan 50 itself generates on the loudspeaker modules 20, 21 and the microphones 22 is suppressed.

As illustrated in FIG. 4 and FIG. 6, the front terminal group 26 is disposed on a front edge part of the electronic substrate 18. Respective connection terminals in the front terminal group 26 front on the outside of the chassis 16 over a front wall 30a of the bottom section 30. The respective connection terminals are, for example, terminals which conform to the USB (Universal Serial Bus) standard, external input/output terminals which conform to the HDMI (a registered trademark) (High-Definition Multimedia Interface) standard and so forth, terminals for power source connection and so forth. A reference numeral 56 in FIG. 1 and FIG. 2 is an external output cable which conforms to, for example, the HDMI standard.

The front wall 30a is in the form of a plate shape for convenience of the shapes and handling of the respective connection terminals in the front terminal group 26 and extends in the right-left direction. The respective connection terminals are disposed on the front wall 30a in a state of being arrayed in the right-left direction. Therefore, the front wall 30a is disposed at a position which is offset more inwardly than a maximum outer diameter portion of the peripheral surface section 32 (see FIG. 6). That is, the front terminal group 26 is arranged in a state of being hidden under the peripheral surface section 32 so as to make the respective connection terminals and terminal portions and so forth of the external output cable 56 which are connected to these connection terminals inconspicuous in the outer appearance of the chassis 16. At the same time, a space which is hidden under the peripheral surface section 32 is formed on the outer side of the front wall 30a. Thus, the suction port 36b is hidden in the outer appearance similarly by forming the suction port 36b in the flange 36a which forms a top surface of this space.

As illustrated in FIG. 4 and FIG. 6, the rear terminal group 28 is disposed on a rear edge part of the electronic substrate 18. Respective connection terminals in the rear terminal group 28 front on the outside of the chassis 16 over a rear wall 30b of the bottom section 30. The respective connection terminals are, for example, terminals which conform to the USB standard, external input/output terminals which conform to the HDMI standard and so forth, terminals for communication cable connection and so forth. Reference numerals 57 and 58 in FIG. 1 and FIG. 2 are external input cables which conform to, for example, the USB standard.

The rear wall 30b is in the form of the plate shape for convenience of the shapes and handling of the respective connection terminals in the rear terminal group 28 and extends in the right-left direction similarly. Then, the respective connection terminals in the rear terminal group 28 are disposed on the rear wall 30b in a state of being arrayed in the right-left direction similarly. Therefore, the respective connection terminals in the rear terminal group 28 and terminal portions and so forth of the external input cable 57 which are connected to these connection terminals are hidden in the outer appearance of the chassis 16 similarly. Further, the exhaust port 36c is hidden under the peripheral surface section 32 by forming the exhaust port 36c in the flange 36a similarly.

As described above, in the electronic device 10 according to the present embodiment, the inside of the chassis 16 is partitioned into the first chamber C1, the second chamber C2 and the third chamber C3. Then, the electronic substrate 18 is housed in the first chamber C1. The loudspeaker modules 20 and 21 are housed in the second chamber C2. The microphones 22 are housed in the third chamber C3. Incidentally, although in the above description, a configuration that the second chassis 14 is installed on the first chassis 12 is exemplified as the configuration of the chassis 16, the chassis 16 may also have a configuration that the inside of one chassis is partitioned into three chambers with the frame member 34 and another frame member which is not illustrated in the drawings.

In the electronic device 10 concerned, the electronic substrate 18, the loudspeaker modules 20 and 21 and the microphones 22 are housed in the mutually partitioned respective chambers C1, C2 and C3 respectively in this way. Therefore, it is possible to suppress noise generation caused by direct action of the vibrations that the loudspeaker modules 20 and 21 generate on the microphones 22. In addition, although it is possible to cope with echoes of sounds which are based on normal voice outputs from the loudspeaker modules 20, 21 through the holes 42a by echo cancellation of sounds in the microphones 22, it is difficult to cope with echoes of sounds which are transmitted from the inside of the chassis 16 via another route by the echo cancellation of the sounds in the microphones 22. In this respect, the electronic device 10 concerned is able to suppress transmission of the vibrations that the loudspeaker modules 20 and 21 generate to the microphones 22 through the inside of the chassis 16 and therefore is able to more suppress noise generation. Accordingly, the electronic device 10 concerned is able to ensure the quality of the microphones 22 and the quality of the loudspeaker modules 20 and 21 by optimally arranging the microphones 22 and the loudspeaker modules 20 and 21 while configuring the chassis 16 into a compact form.

The chassis 16 includes the first chassis 12 in which the first chamber C1 and the second chamber C2 are disposed and the second chassis 14 which is attached to the upper surface 12a of the first chassis 12 and in which the third camber C3 is disposed. The inner space of the first chassis 12 is partitioned into two upper and lower stages with the frame member 34 and thereby the second chamber C2 is arranged above the first chamber C1. Then, the loudspeaker modules 20 and 21 are supported on the upper surface of the frame member 34 with the cushion material 46 being interposed therebetween. That is, it is easy to configure the frame member 34 which partitions the inner space of the first chassis 12 by a metal plate and so forth which are thicker than a member which configures the outer wall of the first chassis 12. Therefore, it becomes possible to suppress the vibrations that the loudspeaker modules 20 and 21 generate more effectively. Moreover, the third chamber C3 in which the microphones 22 are loaded is disposed in the second chassis 14 which is different from the first chassis 12. Therefore, it becomes possible to partition the third chamber C3 apart from the first chamber C1 and the second chamber C2 with ease and it becomes also possible to cut off the vibrations which are transmitted from the loudspeaker modules 20 and 21 more surely. In addition, since the microphones 22 are located on the top of the mountain-shaped chassis 16, reception sensitivity becomes favorable. In addition, since the input operation section such as the operation buttons 44a and 44b and so forth is disposed in the second chassis 14 which is located on the top of the chassis 16, high operability is obtained.

The cooling module 24 is housed in the first chamber C1 and is located above the electronic substrate 18. Then, the cooling module 24 has the fan 50 which sucks the air into the first chamber C1 from the outside and exhausts the air out of the first chamber C1, the fins 52a and 52b which are disposed on an air flow path which is created by the fan 50 and absorb heat that the CPU 18a and so forth which are the heating elements mounted on the electronic substrate 18 generate and the exhaust duct 54. Therefore, the cooling module 24 cools the heating elements such as the CPU 18a and so forth and thereby it becomes possible to suppress degradation of performance. Moreover, the electronic substrate 18 and the cooling module 24 are loaded in the first chamber C1 which is partitioned apart from the respective chambers C2 and C3 which house therein the loudspeaker modules 20 and 21 and the microphones 22 respectively. Therefore, the heat which is generated from the heating elements such as the CPU 18a and so forth does not spread over the entire area of the inner space of the chassis 16. That is, it is sufficient for the cooling module 24 to cool only the range-limited inside of the first chamber C1. Therefore, it becomes possible to configure the fan 50 into a compact form and thereby more compactification of the electronic device 10 concerned becomes possible. In addition, influence of the vibration of the cooling module 24 on the loudspeaker modules 20 and 21 and the microphones 22 is also suppressed. In addition, since the cooling module 24 is disposed in the low-stage first chamber C1, it becomes possible to dispose the suction port 36b and the exhaust port 36c also in the bottom section 30 which is less conspicuous in the outer appearance of the chassis 16.

The first chassis 12 has the disc-shaped bottom section 30 and the peripheral surface section 32 which is disposed on the bottom section 30 and includes the conical outer peripheral surface so that the outer diameter thereof is gradually reduced as it goes upward. Therefore, it becomes easy for the electronic device 10 concerned to direct the outputs from the loudspeaker modules 20 and 21 in all directions and, in addition, the appearance and designability of the chassis 16 is improved.

The frame member 34 has the protruding part 34a which extends along the front-rear direction of the first chassis 12 and is expanded upward and one pair of the plane parts 34b and 34c which is disposed on the both sides of the protruding part 34a in the right-left direction which is orthogonal to the direction that the protruding part 34a extends. The loudspeaker modules 20 and 21 are disposed on one pair of the plane parts 34b and 34c respectively. The cooling module 24 is at least partially housed in the space which is formed on the lower-surface side of the protruding part 34a and is configured to make the air flow along the front-rear direction. That is, in the electronic device 10 concerned, the protruding part 34a is disposed in a dead space where the loudspeaker modules 20 and 21 are not installed in the second chamber C2 and the first chamber C1 is formed large by that amount. Therefore, the electronic device 10 concerned makes it possible to suppress enlargement of the chassis 16 itself while ensuring an installation space for the cooling module 24 in the first chamber C1.

In the electronic device 10 concerned, the front terminal group 26 and the rear terminal group 28 to which the cables for electrically connecting the electronic substrate 18 with external devices such as a PC and so forth are to be connected are disposed on the bottom section 30. These terminal groups 26 and 28 are disposed at positions where the terminal groups 26 and 28 overlap the air flow path which is created by the cooling module 24 (the fan 50) and overlap the suction port 36b and the exhaust port 36c. Accordingly, for example, in a case where the electronic device 10 concerned is used in a state of being placed on a table on right and left of which persons sit, the electronic device 10 is arranged in a posture so that, for example, the front of the chassis 16 is directed to an external display which is installed on the front side. Thereby, since the front terminal group 26 is arranged in a state of fronting on the external display, it is possible to smoothly connect the external output cable 56 to the external display. Then, the front terminal group 26 and the rear terminal group 28 are disposed in a state of fronting on the front and the rear of the table respectively. Therefore, the cables 56 to 58 are not disposed in a space which is present in front of the persons who sit on the right and left of the table and do not become obstacles. On the other hand, the respective loudspeakers 20L, 20R, 21L and 21R of the loudspeaker modules 20 and 21 are arranged to face the persons who are present on the right and left of the table respectively and therefore are able to smoothly transmit the voices and so forth to the persons. Moreover, since the cooling module 24 makes the air flow in the front-rear direction, the air which is exhausted through the rear exhaust port 36c does not give a sense of discomfort to the persons who sit on the right and left of the table.

Incidentally, the present invention is not limited to the above-described embodiment and it goes without saying that it is possible to freely alter and modify the present invention within a range not deviating from the gist of the present invention.

The invention claimed is:

1. An electronic device comprising:
   a chassis which has mutually partitioned chambers, including a first chamber, a second chamber and a third chamber;
   an electronic substrate housed in the first chamber;
   a loudspeaker housed in the second chamber; and
   a microphone housed in the third chamber, wherein:
   the chassis includes a first chassis in which the first chamber and the second chamber are disposed, and a second chassis attached to an upper surface of the first chassis and in which the third chamber is disposed,
   an inner space of the first chassis is partitioned into two upper and lower stages with a frame member, and thereby the second chamber is above the first chamber, and
   the loudspeaker is on an upper surface of the frame member.

2. The electronic device according to claim 1, further comprising:
   a cooling module housed in the first chamber and disposed above the electronic substrate, wherein:

the cooling module has a fan which sucks air from outside of the first chamber and exhausts the air to the outside of the first chamber, and has a fin disposed in an air flow path which is created by the fan and absorbs heat generated from a heating element mounted on the electronic substrate.

3. The electronic device according to claim 2, wherein:
the first chassis has a disc-shaped bottom section and a peripheral surface section disposed on the bottom section, and has a conical outer peripheral surface having an outer diameter thereof that is gradually reduced in an upward direction, and
the second chassis is in a disc shape and is attached to an upper surface of the peripheral surface section.

4. The electronic device according to claim 3, wherein:
an input operation section is in the second chassis.

5. The electronic device according to claim 3, wherein:
the frame member has a protruding part which extends along a front-rear direction of the first chassis and is expanded upward, and has one pair of plane parts which is on both sides of the protruding part in a right-left direction which is orthogonal to a direction that the protruding part extends,
the loudspeaker is on each of one pair of the plane parts and
the cooling module is at least partially housed in a space which is formed on a lower surface side of the protruding part and makes air flow along the front-rear direction.

6. The electronic device according to claim 5, wherein:
a suction port, through which air is sucked into the first chamber, is on one side of the bottom section in the front-rear direction, and an exhaust port, through which the air is exhausted from the first chamber, is on the other side of the bottom section in the front-rear direction.

7. The electronic device according to claim 5, wherein:
a connection terminal to which a cable, which electrically connects the electronic substrate with an external device is to be connected, is on the bottom section and
the connection terminal is at a position where the connection terminal overlaps the air flow path created by the fan of the cooling module.

8. The electronic device according to claim 5, wherein:
the loudspeaker on the plane part, which is located on left of the protruding part, faces an inner surface of the peripheral surface section with a gap being interposed therebetween by being arranged to direct toward diagonally upper left in the right-left direction,
the loudspeaker on the plane part which is located on right of the protruding part, faces the inner surface of the peripheral surface section with a gap being interposed therebetween by being arranged to direct toward diagonally upper right in the right-left direction, and
holes are in the peripheral surface section at least at positions where the holes face the loudspeakers.

* * * * *